United States Patent [19]

Ogata

[11] Patent Number: 5,444,678
[45] Date of Patent: Aug. 22, 1995

[54] MAGNETO-OPTIC RECORDING MAGNETIC HEAD HAVING MAGNETIC GAP WHICH HAS DIFFERENT SIZES IN MAGNETIC FIELD MODULATION MODE AND LIGHT MODULATION RECORDING MODE

[75] Inventor: Takashi Ogata, Tokyo, Japan

[73] Assignee: Olympus Optical Co., Ltd., Tokyo, Japan

[21] Appl. No.: 116,360

[22] Filed: Sep. 3, 1993

[30] Foreign Application Priority Data

Sep. 9, 1992 [JP] Japan ................................. 4-240891
Oct. 22, 1992 [JP] Japan ................................. 4-308098

[51] Int. Cl.⁶ ........................ G11B 11/10; G11B 13/04
[52] U.S. Cl. ...................................... 369/13; 360/114;
 360/103
[58] Field of Search .................... 369/13, 14; 360/114,
 360/59, 102, 103

[56] References Cited

U.S. PATENT DOCUMENTS 5,202,863 4/1993 Miyatake et al. ..................... 369/13
5,313,444 5/1994 Ishii et al. ................................ 369/13

FOREIGN PATENT DOCUMENTS 3-216836 9/1991 Japan .
3-268253 11/1991 Japan .

Primary Examiner—George Y. Epps
Assistant Examiner—Tan Dinh
Attorney, Agent, or Firm—Frishauf, Holtz, Goodman & Woodward

[57] ABSTRACT

A magneto-optic recording magnetic head applies first and second magnetic fields to a magneto-optic disk having a recording film. The first magnetic field is used in a magnetic field modulation mode and the second magnetic field is utilized in a light modulation mode. The head comprises a yoke formed of a magnetic substance and having an opposing surface which opposes the recording film of the magneto-optic disk. A magnetic gap is formed between the yoke and a main magnetic pole magnetically coupled to the yoke. A cross-sectional area of the gap on a plane parallel to the recording film of the magneto-optic recording medium changes depending on whether the first or second magnetic field is generated, to maximize strengths of the first and second magnetic fields in accordance with the distance between the opposing surface of the yoke and the recording film of the disk.

12 Claims, 10 Drawing Sheets

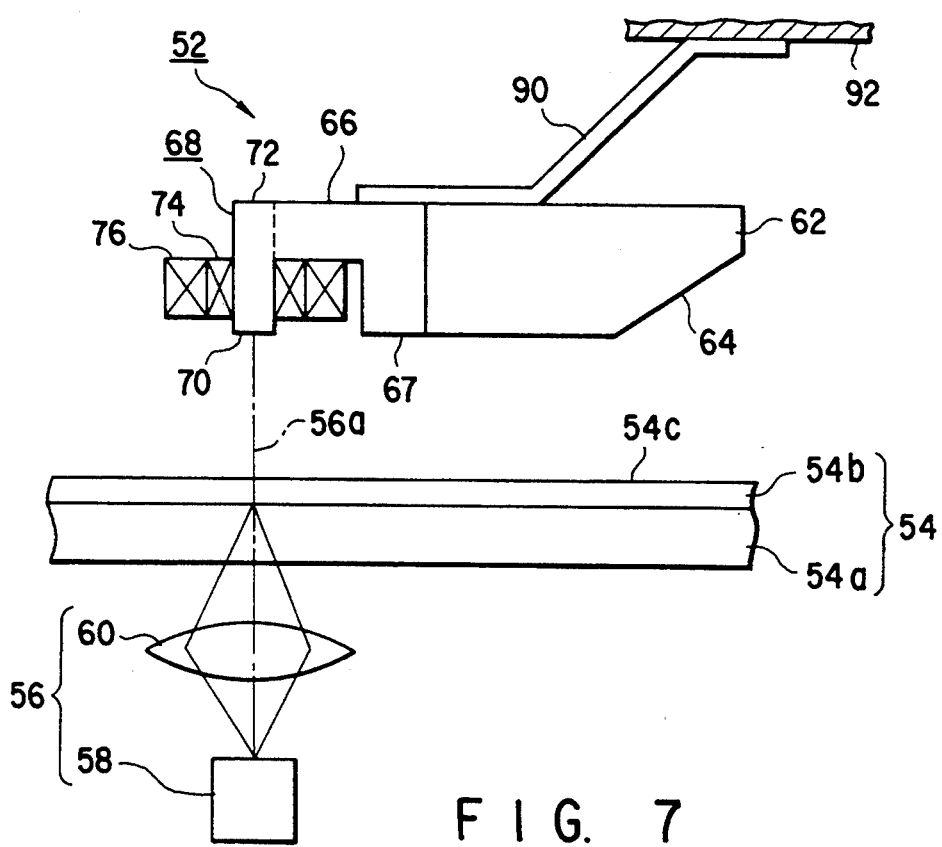
F I G. 7

MAGNETO-OPTIC RECORDING MAGNETIC HEAD HAVING MAGNETIC GAP WHICH HAS DIFFERENT SIZES IN MAGNETIC FIELD MODULATION MODE AND LIGHT MODULATION RECORDING MODE

BACKGROUND OF THE INVENTION

1. Field of the Invention

The present invention relates to a magneto-optic recording magnetic head used for a recording/reproducing apparatus for recording/reproducing information on/from a magneto-optic recording medium and adapted to apply a recording magnetic field to the magneto-optic recording medium. In this case, "the recording/reproducing apparatus" is a general term indicating a recording apparatus for recording information on a magneto-optic recording medium, a reproducing apparatus for reproducing information recorded on a magneto-optic recording medium, and a recording/reproducing apparatus for performing both a recording operation and a reproducing operation.

2. Description of the Related Art

As a conventional magneto-optic recording/reproducing apparatus, an apparatus using a light modulation scheme is known. In this scheme, the intensity of a laser beam is changed in accordance with a recording signal while a magnetic field having a predetermined strength is applied to a magneto-optic recording medium. This apparatus will be described below with reference to FIG. 1.

In the apparatus, a light beam 8 having a predetermined intensity is radiated on a recording film 6 made of a magnetic film formed on a substrate 4 of a magneto-optic recording medium, e.g., a magneto-optic disk (to be simply referred to as a disk hereinafter) 2. The light beam 8 is emitted from a laser diode 10 and is focused on the recording film 6 through a lens 12. The temperature of the recording film 6 is increased to a point near its Curie point by the light beam 8. While the temperature of the recording film 6 is maintained in this state, a magnetic field in a predetermined direction, i.e., an erase magnetic field, is applied to the recording film 6 by a magnetic field applying unit 14. As a result, the recording film 6 is uniformly magnetized in the erase direction.

Subsequently, a magnetic field (recording magnetic field) in a direction opposite to the erase direction is applied to the recording film 6 by the magnetic field applying unit 14. While this recording magnetic field is applied, the light beam 8 is radiated on the recording film 6. The intensity of the light beam 8 is changed in accordance with a recording signal by a light modulator 16 electrically connected to the laser diode 10.

with this operation, when the intensity of the light beam 8 is low, the temperature of the recording film 6 is not increased to the Curie point, and the direction of magnetization is maintained in the erase direction. In contrast to this, when the intensity of the light beam 8 is high, the temperature of the recording film 6 is increased to a point near the Curie point, and the coercive force of the recording film 6 is reduced to reverse the direction of magnetization of the recording film 6 from the erase direction to the direction of the recording magnetic field. As a result, a magnetization pattern corresponding to the recording signal is formed on the recording film 6.

In contrast to such a recording/reproducing apparatus of the light modulation scheme, a recording/reproducing apparatus using a magnetic field modulation scheme has been studied and developed. In this scheme, erase and recording operations are simultaneously performed to shorten the recording time.

In this apparatus, a laser beam having a predetermined intensity is radiated on a magneto-optic disk in advance. The temperature of the magnetized film is increased to the Curie point and is maintained. A magnetic field modulated in accordance with a recording signal is applied to the magnetized film to leave a magnetic pattern corresponding to a change in magnetic field on the magnetized film, thus recording information thereon.

When high-density recording is to be performed by such a magnetic field modulation scheme, it is generally required that the polarity of a magnetic field having a high strength of several hundreds Oe or more be switched at a high speed in accordance with a recording signal. In order meet this requirement, a magnetic head having a high recording efficiency (a generated magnetic field efficiency per excitation current) and exhibiting a low impedance in high-frequency excitation is required. As a magnetic head which can satisfy the requirement, a floating magnetic head has been proposed. This magnetic head is designed such that the distance between the head and a magneto-optic disk is set to be very small, about several $\mu$m, to improve the recording efficiency, and the cross-sectional area and length of a core are reduced to achieve a reduction in impedance.

As shown in FIG. 2, a floating magnetic head 18 comprises a floating slider 20, a core 22, a coil 24, and a ginbal spring 26. The floating slider 20 is biased toward the disk 2 by the ginbal spring 26 so as to be in contact with the disk 2 while the disk is at rest. When the disk 2 is rotated, a flow of air produced by the rotation of the disk 2 balances the floating force produced in the floating slider 20 and the biasing force of the ginbal spring 26, thus obtaining an optimal floating amount.

When such a floating magnetic head is to be used, the upper surface of the recording film 6 is coated with a protective film 28 to prevent damage to the head and the recording film 6 due to contact of the head with the disk 2 during loading of the head.

As described above, owing to the differences in the type of a magnetic field applying unit, the surface coating of a disk, and the like between the light modulation scheme and the magnetic field modulation scheme, it is difficult to ensure compatibility that allows the disk on which information is recorded by the light modulation scheme to be used in a recording/reproducing apparatus of the magnetic field modulation scheme. Assume that information is to recorded on a disk for the light modulation scheme using a floating magnetic head used for the magnetic field modulation scheme. In this case, since no protective film is formed on the disk for the light modulation scheme, loading of the floating magnetic head which involves the contact with the disk cannot be performed and floating the head becomes impossible. Therefore, the disk must be separated from the head by a certain distance without floating the head. As a result, a magnetic field generated by the magnetic head does not reach a portion, of the disk, which is irradiated with a light spot, and hence a sufficient magnetic field strength cannot be obtained. In addition, since the floating force of the floating head and the biasing force of the ginbal spring cannot be balanced by using the above-mentioned flow of air, the magnetic head is inclined with respect to the disk. As a result, the direction of the center of the applied magnetic field is inclined with respect to a light spot, and the range of the light spot and that of the applied magnetic field deviate from each other.

As a means for solving such problems, for example, Jpn. Pat. Appln. KOKAI Publication Nos. 3-216836 and 3-268253 disclose a recording/reproducing apparatus having a magneto-optic recording magnetic head integrally formed of a magnetic head for magnetic field modulation and a magnetic head for light modulation.

As shown in FIGS. 3 and 4, a magnetic head 32 has a first coil 34 for magnetic field modulation and a second coil 36 for light modulation. These first and second coils 34 and 36 are wound around a slider core 38 made of a soft magnetic substance. The slider core 38 is supported on the housing (not shown) of the apparatus through a ginbal spring 40.

In this apparatus, as shown in FIG. 3, after the head 32 is brought into contact with a disk 2 for magnetic field modulation, the head 32 is floated by a flow of air produced by rotation of the disk 2. In this state, a current is supplied to the first coil 34. This current changes its direction in accordance with a recording signal. The direction of a magnetic field generated by the first coil 34 is changed in accordance with a recording signal to perform magnetic field modulation recording.

As shown in FIG. 4, the head 32 is fixed in a separated state with respect to a disk 2 for light modulation. In this state, a current is supplied to the second coil. This current changes its direction depending on a set mode, i.e., the recording mode or the erase mode, but does not change the direction in accordance with a recording signal. In this manner, light modulation recording is performed.

No protective coat for the floating magnetic head is formed on a disk for light modulation. Therefore, when information is to be recorded/reproduced on/from a disk for light modulation by using the above-described composite magneto-optic recording magnetic head, a certain distance must be ensured between the head and the disk to prevent the head from damaging the disk.

This distance is kept to be a value that prevents contact of the head with the disk, e.g., about 0.5 mm which exceeds the maximum value of surface fluctuations of the disk. In contrast to this, when information is to be recorded/reproduced on/from a disk for magnetic field modulation, the floating amount of the head with respect to the disk is about several $\mu$m.

With this arrangement, the magnitude of a magnetic field required for a light modulation recording operation is much larger than that required for a magnetic field modulation recording operation. The main magnetic pole of the above-described composite head is a very thin pole formed for magnetic field modulation. When a DC magnetic field for light modulation, which is larger in magnitude than a magnetic field for magnetic field modulation, is applied to the disk by using such a thin main magnetic pole, the main magnetic pole is magnetically saturated by this DC magnetic field.

Once the main pole is magnetically saturated, even if a current supplied to the coil for light modulation is increased, the magnetic flux density in the main magnetic pole does not increase beyond the saturated value, resulting in a substantial deterioration in recording efficiency. For this reason, in order to obtain a required magnetic field, a larger magnetomotive force is required.

If this increase in magnetomotive force is obtained by increasing the number of turns of a coil, the volume and weight of the coil is increased. As a result, the floating amount of the head is decreased, or the balance between the weight of the coil and that of the slider is lost, resulting in an unstable floating action. If the increase in magentomotive force is to be achieved by increasing the current, the loss in the driving circuit for supplying a current to the coil or the loss in the coil itself is increased.

In order to prevent magnetic saturation of the main magnetic pole, it is effective to increase the cross-sectional area of the main magnetic pole within a plane parallel to the recording surface of the disk. In a magnetic field modulation recording operation, however, it is preferable that a magnetic field be applied to the disk at a high frequency of several MHz while keeping the power consumption low. In order to satisfy this requirement, the inductance of the head needs to be decreased. In order to realize a reduction in the impedance of the head while ensuring a high-frequency magnetic field for the head, it is effective to minimize the area of the main magnetic pole of the head without decreasing the number of turns of the coil.

As described above, in the light modulation recording mode, the area of the main magnetic pole within the plane parallel to the recording surface of the disk is preferably large. In the magnetic field modulation recording mode, the area is preferably small. That is, the required cross-sectional area of the main magnetic pole of the head is different between the light modulation recording mode and the magnetic field modulation recording mode. Therefore, in a head having coils for magnetic field modulation and light modulation wound therearound, as in the above-described composite magnetic head, if the cross-sectional area of the main magnetic pole is set to be small, a deterioration in recording efficiency is caused by magnetic saturation of the main magnetic pole in a light modulation recording operation. If the cross-section area of the main magnetic pole is set to be larger, the power consumption of the head driving circuit is increased in a magnetic field modulation recording operation.

In a recording/reproducing apparatus, a leakage DC magnetic field having a predetermined strength is produced by an optical pickup actuator for radiating a light spot on a magneto-optic recording medium. This leakage magnetic field, i.e., an external magnetic field, is applied to the magnetic head. In general, when the magnetic field in this direction is applied to a magnetic member whose cross-sectional area or length is small when viewed from a predetermined direction, magnetic saturation of the magnetic member easily occurs. In the above-described case, if a portion, of the slider core, around which a coil for magnetic field modulation is wound is magnetically saturated in one direction, a magnetic field sufficient for recording cannot be obtained even by increasing an alternating current supplied to the coil for magnetic field modulation.

Assume that a magnetic field H generated by a coil for magnetic field modulation and a magnetic flux $\Phi$ generated in the coil for magnetic field modulation have the relationship shown in FIG. 5 while no external magnetic field is present and no magnetic saturation is caused. In this case, when the slider core is magnetically saturated in one direction, an amplitude $\Delta H$ of a high-frequency magnetic field generated by the coil for magnetic field modulation is shifted in proportion to an external magnetic field 44 applied, as shown in FIG. 6. For this reason, the magnetic flux Φ does not increase, and a magnetic flux change ΔΦ is reduced proportionally. If the magnetic flux change ΔΦ is small, the magnetic field strength required for an erase/recording operation cannot be obtained, resulting in a deterioration in recording efficiency.

SUMMARY OF THE INVENTION

The present invention has been made to solve the above-described conventional problems, and has an object to provide a magneto-optic recording magnetic head which can improve the recording efficiency without increasing the weight and power consumption of the head.

According to the present invention, there is provided a magneto-optic recording magnetic head for applying first and second magnetic fields to a magneto-optic recording medium having a recording film, the first magnetic field changing in polarity in accordance with a recording signal, and the second magnetic field exhibiting different polarities in an erase mode and a recording mode but undergoing no change in polarity with respect to the recording signal, comprising: a yoke having a magnetic substance; a main magnetic pole having a first end opposing the magneto-optic recording medium and a second end located on a side opposite to the first end and magnetically coupled to the yoke; first and second coils for respectively applying the first and second magnetic fields to the magneto-optic recording medium in cooperation with the main magnetic pole; and at least one magnetic gap formed between the first end of the main magnetic pole and the yoke to oppose the recording film of the magneto-optic recording medium, a cross-sectional area of the magnetic gap on a plane parallel to the recording film of the magneto-optic recording medium changing depending on whether the first or second magnetic field is generated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a partially cutaway side view showing a magneto-optic recording magnetic head according to the first embodiment of the present invention;

DETAILED DESCRIPTION OF THE PREFERRED EMBODIMENTS

Figure 1:
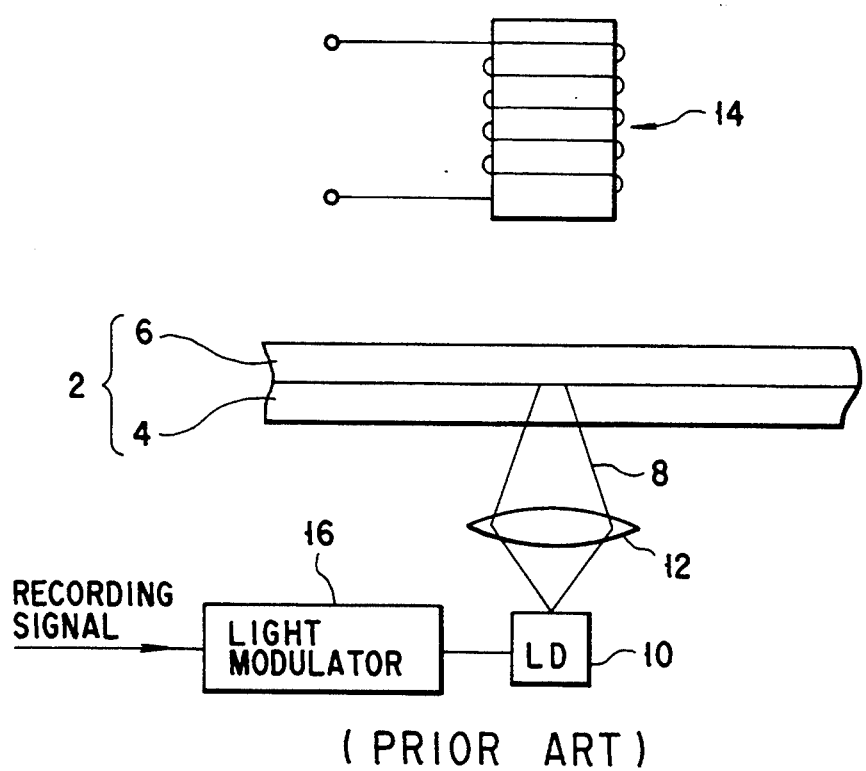
FIG. 1 is a side view showing a recording/reproducing apparatus of a light modulation scheme.
Figure 2:
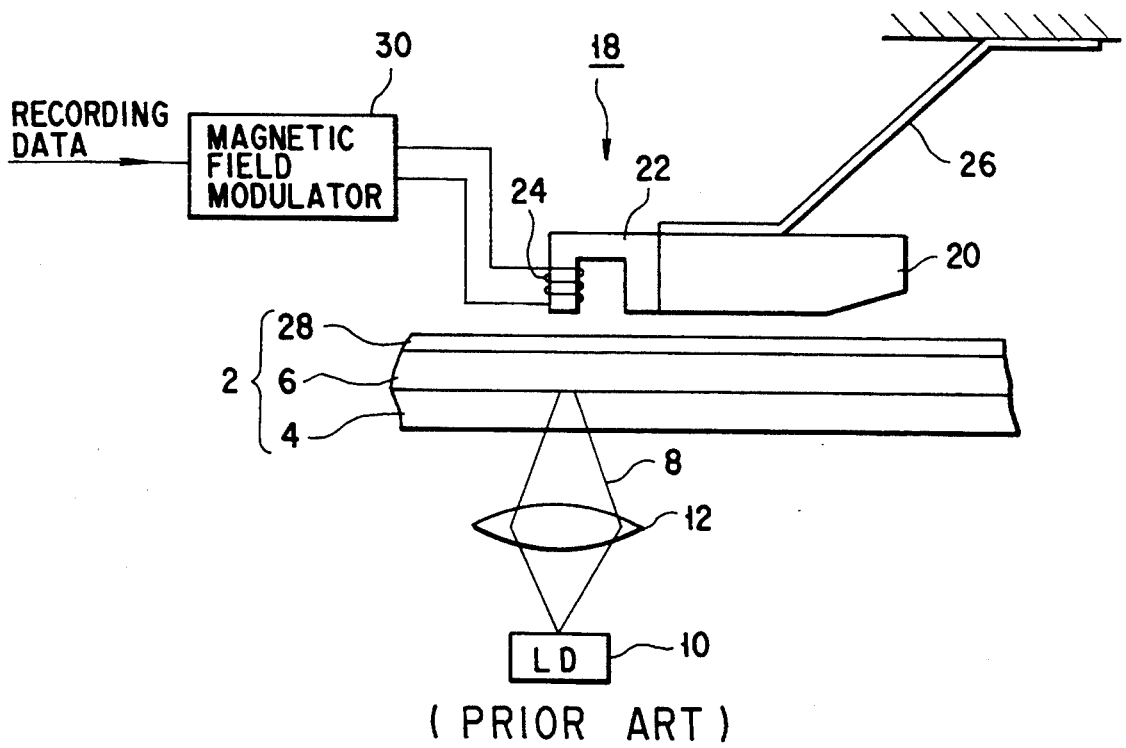
FIG. 2 is a partially cutaway side view showing a recording/reproducing apparatus of a magnetic field modulation scheme using a floating magnetic head.
Figure 3:
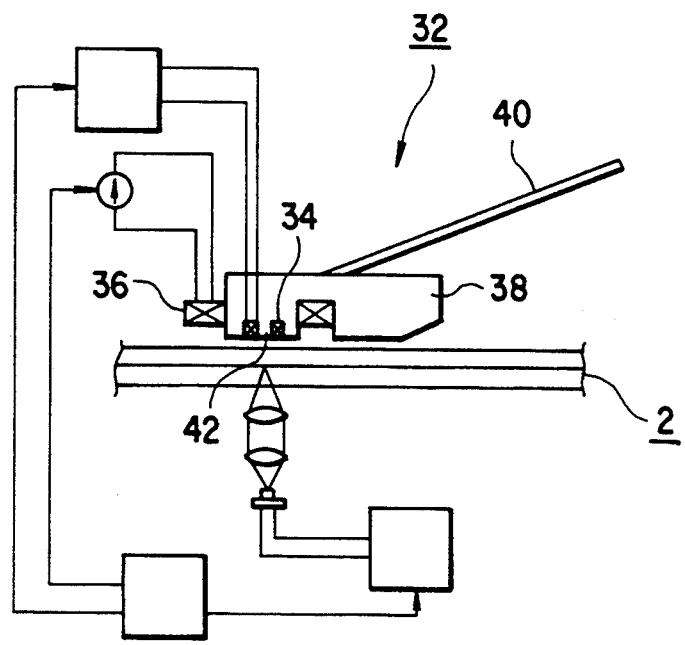
FIG. 3 is a partially cutaway side view showing a recording/reproducing apparatus using a composite magnetic head and an operation of the head in a magnetic field modulation recording mode.
Figure 4:
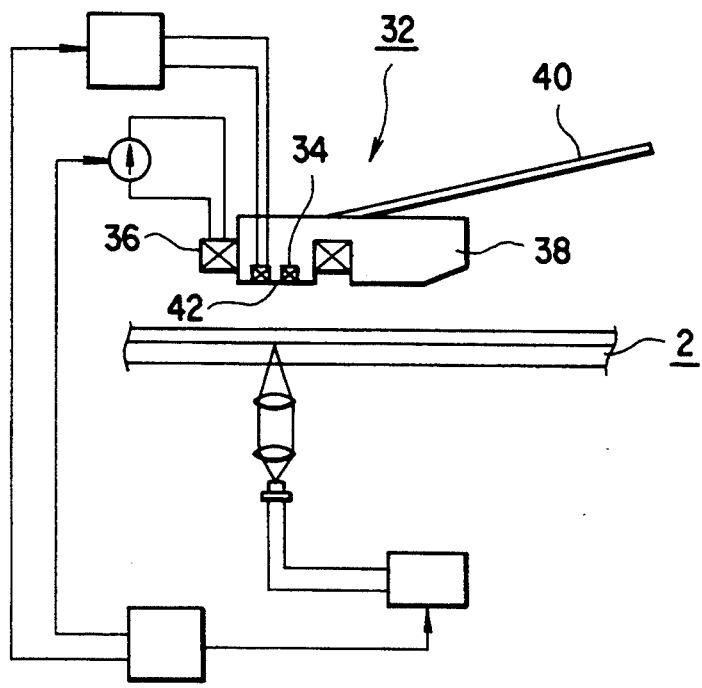
FIG. 4 is a partially cutaway side view showing an operation of the head of the apparatus shown in FIG. 3 in a light modulation recording mode.
Figure 5:
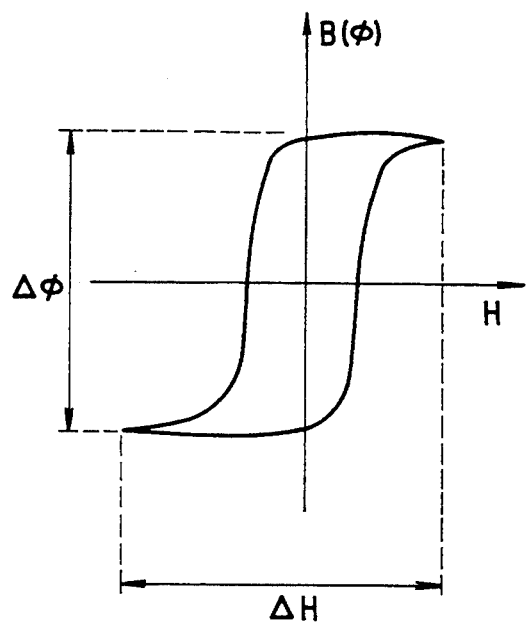
FIG. 5 is a graph showing the relationship between the magnetic flux and the magnetic field generated by a magnetic field modulation coil of the apparatus in FIG. 3 in a state wherein a slider core is not magnetically saturated.
Figure 6:
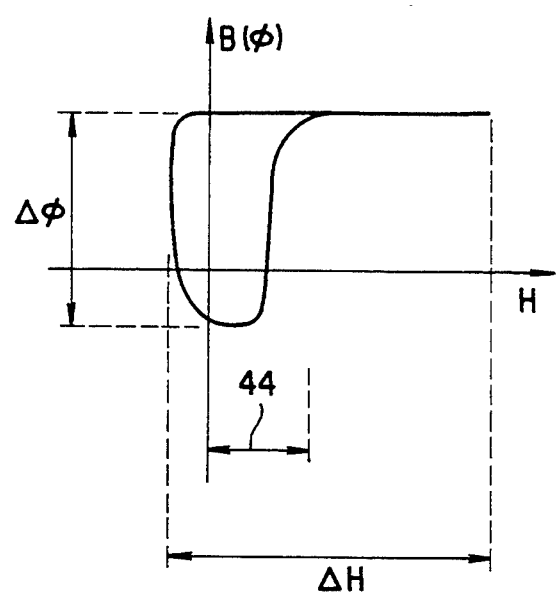
FIG. 6 is a graph showing the relationship between the magnetic flux and the magnetic field generated by a magnetic field modulation coil of the apparatus in FIG. 3 in a state wherein the slider core is magnetically saturated.

A magneto-optic recording magnetic head according to an embodiment of the present invention will be described below with reference to the accompanying drawings.

Referring to FIG. 7, reference numeral 52 denotes a magneto-optic recording magnetic head (to be simply referred to as a head hereinafter). The head 52 applies a first magnetic field for magnetic field modulation and a second magnetic field for light modulation onto a magneto-optic disk (to be simply referred to as a disk hereinafter) 54. An optical pickup 56 is disposed below the head 52. The optical pickup 56 is disposed such that the disk 54 is located between the optical pickup 56 and the head 52. The optical pickup 56 includes a semiconductor laser element 58 for emitting a laser beam, and a condenser lens 60 for focusing a laser beam onto a recording film 54b formed on a substrate 54a.

The head 52 includes a slider 62. The slider 62 has an inclined surface 64 on an end portion located on the right side in FIG. 7. An L-shaped core (yoke) 66 made of a magnetic substance (magnetic material) is mounted on the left end portion of the slider 62. The core 66 opposes the recording film 54b of the disk 54 at its opposing surface 67. A main magnetic pole 68 is formed on the core 66. The main magnetic pole 68 is made of the same material as that for the core 66 and is integrally formed with the core 66.

The main magnetic pole 68 has first and second ends 70 and 72. The first end 70 opposes the disk 54 and is located immediately above a light spot radiated on the disk 54. The second end 72 is magnetically coupled to the core 66.

Figure 8:
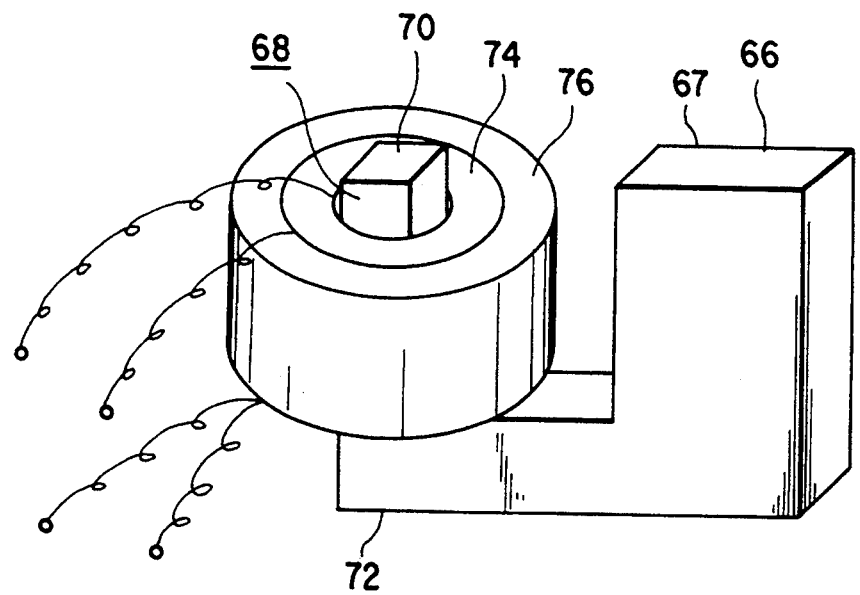
FIG. 8 is a perspective view of the magnetic head shown in FIG. 7.

As shown in FIG. 8, a first coil 74 for magnetic field modulation is mounted on the main magnetic pole 68. A second coil 76 for light modulation is disposed around the first coil 74.

Figures 9, 10:
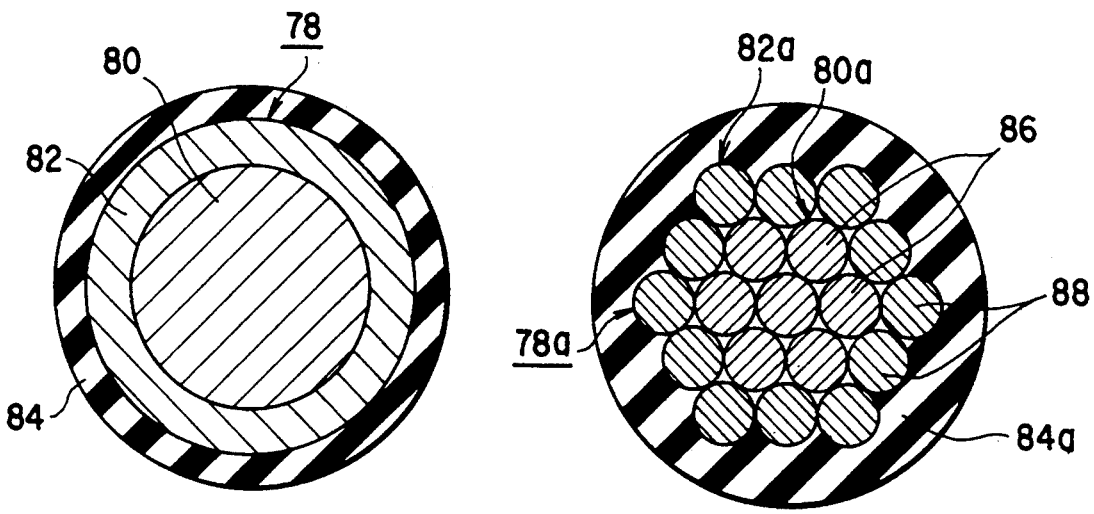
FIG. 9 is a sectional view of a conductor of a first coil of the magnetic head in FIG. 7, taken along a direction perpendicular to a current flowing in the conductor.
FIG. 10 is a sectional view showing a modification of the conductor in FIG. 9.

The first coil 74 is formed by winding a conductor 78 around the main magnetic pole 68 a plurality of turns. FIG. 9 shows a cross-section of this conductor 78, taken along a direction perpendicular to the flowing direction of a current. The conductor 78 has an inner circumferential portion 80 made of a conductive, magnetic material. As the material for the inner circumferential portion 80, a material exhibiting excellent magnetic properties during application of a DC magnetic field, for example, iron or an iron alloy such as silicon steel, is preferable.

An outer circumferential portion 82 made of a conductive, nonmagnetic material is formed around the inner circumferential portion 80. As the material for the outer circumferential portion 82, copper or aluminum is preferable. The outer circumferential portion 82 is covered with an insulating film 84 made of a resin material or the like.

Although the conductor 78 having the cross-sectional structure shown in FIG. 9 is used in this embodiment, a conductor 78a shown in FIG. 10 may be used. An inner circumferential portion 80a of the conductor 78a shown in FIG. 10 comprises a plurality of (seven in FIG. 10) wires 86. Similarly, an outer circumferential portion 82a comprises a plurality of (12 in FIG. 10) wires 88.

The second coil 76 shown in FIG. 8 is formed by winding a conductor around the first coil 74 a plurality of turns. This conductor is made of a nonmagnetic material having a high conductivity, e.g., copper, similar to a conductive material for a general coil. The conductor is covered with an insulating film (not shown) such as a resin film.

As shown in FIG. 7, one end portion of a ginbal spring 90 is fixed to the upper surfaces of the core 66 and the slider 62. The other end portion of the ginbal spring 90 is fixed to a housing 92 of a recording/reproducing apparatus (not shown). The ginbal spring 90 is moved by a driving mechanism (not shown) to bring the head 52 into contact with the disk 54 or separate the head 52 therefrom.

The ginbal spring 90 biases the head 52 toward the disk 54 to bring the head 52 into contact therewith while the disk 54 is at rest in a magnetic field modulation recording operation.

Either in the magnetic field modulation scheme or in the light modulation scheme, the center of the main magnetic pole 68 of the head 52 is set on the extended line of an optical axis 56a of the optical pickup 56. With this setting, a recording/erasing magnetic field can be applied to the same portion as the portion, of the recording film 54b of the disk 54, on which a light spot from the optical pickup 56 is formed.

A recording method using the head of the embodiment will be described next. Although the recording method will be described with reference to FIGS. 11 and 12, illustration of the slider 62 and the ginbal spring 90 is omitted in FIGS. 11 and 12 for the sake of descriptive convenience.

A sequence of magnetic field modulation will be described first. While the disk 54 is at rest, the head 52 is in contact with a surface 54c of a protective film 54d of the disk 54. The disk 54 is rotated by a spindle motor (not shown). When the disk 54 is rotated, a flow of air generated by the rotation of the disk 54 is guided by the inclined surface 64 (shown in FIG. 7) of the slider 62 (shown in FIG. 7) to enter between the head 52 and the disk 54. As a result, the head 52 floats against the biasing force of the ginbal spring 90 (shown in FIG. 7).

Figure 11:
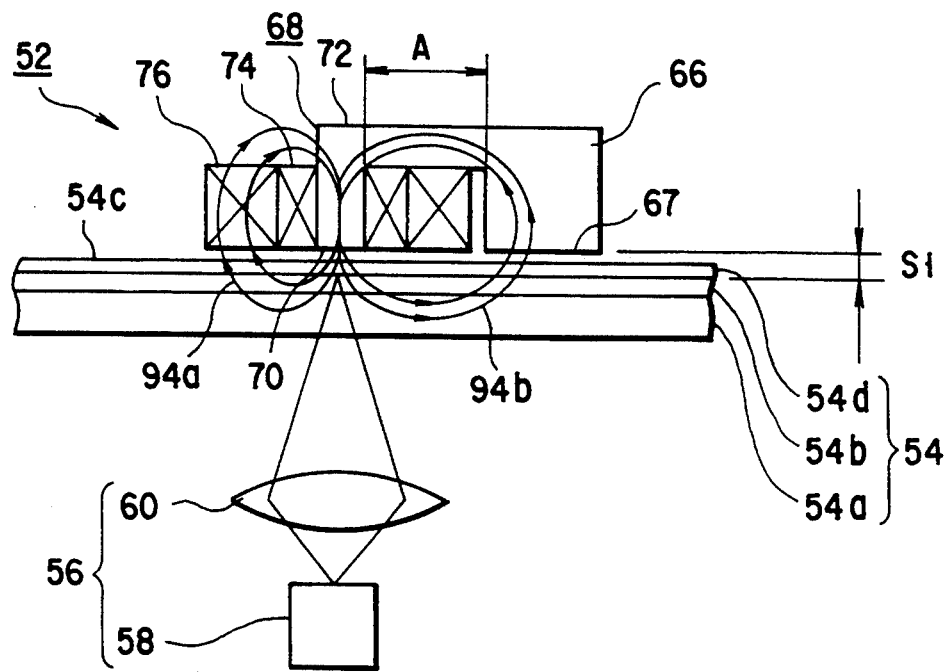
FIG. 11 is a partially cutaway side view showing a state wherein the magnetic head of the first embodiment is performing a magnetic field modulation recording operation.
Figure 12:
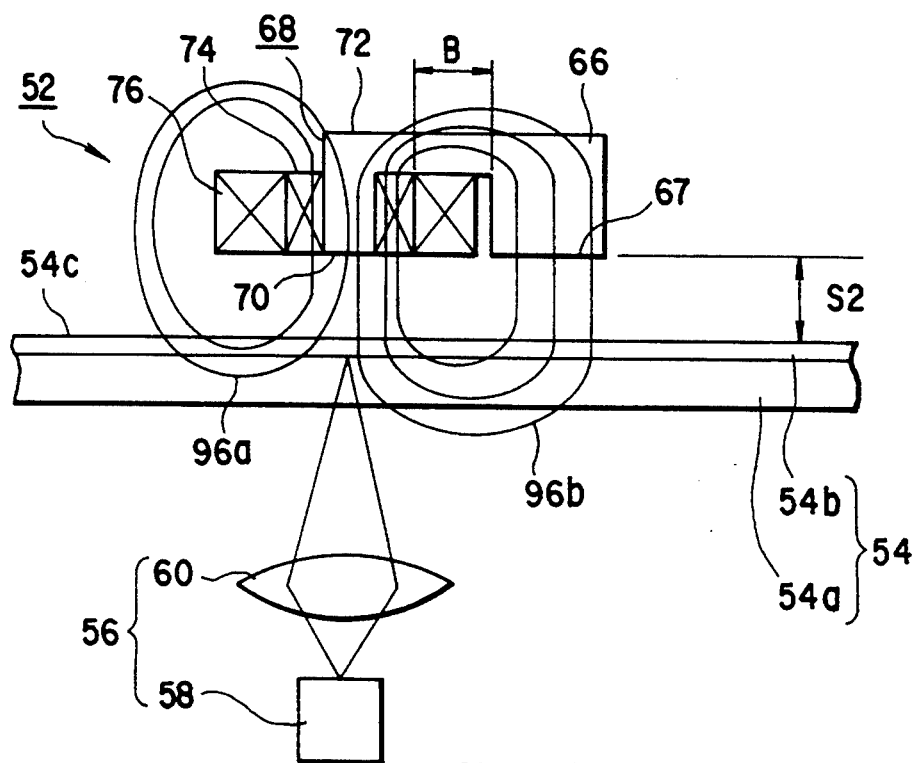
FIG. 12 is a partially cutaway side view showing a state wherein the magnetic head of the first embodiment is performing a light modulation recording operation.

Referring to FIG. 11, a floating amount S1 of the head 52 with respect to the recording film 54b of the disk 54 is about several $\mu$m to several tens $\mu$m. In this state, a laser beam having a predetermined intensity is emitted from the semiconductor laser element 58 of the optical pickup 56. This laser beam is focused on the recording film 54b of the disk 54 by the condenser lens 60. The temperature of the recording film 54b is then increased to its Curie point or more.

In addition, a current which changes its direction in accordance with a recording signal is supplied to the first coil 74 of the head 52 by a magnetic field modulator (not shown). At this time, no current is supplied to the second coil 76.

A first magnetic field 94 is generated by the current flowing in the first coil 74. The magnetic field 94 can be roughly classified into two magnetic fields which respectively flow through magnetic paths 94a and 94b shown in FIG. 11.

The magnetic field flowing through the path 94a passes through the main magnetic pole 68 as a magnetic substance, the second coil 76, and the disk 54 to circulate around the first coil 74. The magnetic field flowing through the path 94b is guided by the main magnetic pole 68 as a magnetic substance and the core 66, to circulate so as to avoid a gap A between the main magnetic pole 68 and the core 66. Therefore, when the first magnetic field 94 is applied, the gap A can be regarded as the magnetic gap of the head 52.

Since a current flowing in the first coil 74 changes its direction in accordance with a recording signal, the polarity of the first magnetic field 94 also changes with this change in direction. When this first magnetic field 94 is applied to the recording film 54b of the disk 54, the direction of magnetization of the recording film 54b corresponds to the direction of the first magnetic field 94. As a result, a magnetic pattern corresponding to a change in the first magnetic field 94 is written in the recording film 54b.

In a light modulation recording operation, the head 52 is lifted from the surface 54c of the disk 54 by a driving mechanism (not shown) by a distance S2, as shown in FIG. 12. The position of the head 52 is then fixed. The disk 54 is rotated by the spindle motor (not shown), and a laser beam is radiated on the disk 54 by the optical pickup 56 to locally increase the temperature of the disk 54 to the Curie point or more.

At the same time as the laser beams is radiated, an erase operation is performed with respect to the recording film 54b of the disk 54. In this erase operation, a current which causes the direction of magnetization of the disk 54 to coincide with the erase direction is supplied to the second coil 76. This current is a DC current which does not change its direction in accordance with a recording signal.

When a current is supplied to the second coil 76, no current is supplied to the first coil 74. Since the first coil 74 has the inner circumferential portion 80 made of a magnetic material, as shown in FIG. 9, the first coil 74 having no current flowing therein can be regarded as a magnetic substance. The first coil 74 is mounted on the main magnetic pole 68. Therefore, in a light modulation recording operation, the first coil 74 serves as a main magnetic pole of the head 52 as well as the main magnetic pole 68.

A second magnetic field 96 is generated by the current flowing in the second coil 76. The second magnetic field 96 can be roughly classified into two magnetic fields which respectively flow through magnetic paths 96a and 96b shown in FIG. 12.

The magnetic field flowing the magnetic path 96a passes through the main magnetic pole 68 as a magnetic substance, the first coil 74 regarded as a magnetic substance as a whole, and the disk 54 to circulate around the second coil 76. The magnetic field flowing through the magnetic path 94b is guided by the main magnetic pole 68 and the first coil 74, which are regarded as an integral main magnetic pole, and the core 66, to circulate so as to avoid a gap B between the first coil 74 and the core 66. Therefore, when the second magnetic field 96 is applied, the gap B can be regarded as the magnetic gap of the head 52.

When the second magnetic field 96 in the erase direction is applied, since the disk 54 has been heated to the Curie point or more by the laser beam from the optical pickup 56, the recording film 54b of the disk 54 is uniformly magnetized in the erase direction. Consequently, information recorded, as a magnetic pattern, on the recording film 54b of the disk 54 is erased.

In an information recording operation, a DC current is supplied to the second coil 76 in a direction opposite to the direction in the erase mode to change the direction of the second magnetic field 96 to a recording direction. The direction of this second magnetic field 96 is not changed by a recording signal. While the second magnetic field 96 is generated, the intensity of a laser beam from the semiconductor laser element 58 is changed by a light modulator (not shown) in accordance with a recording signal. When the intensity of the laser beam is high, the direction of magnetization of the recording film 54b of the disk 54 is caused to coincide with the direction of the second magnetic field 96, i.e., the direction of magnetization in the recording mode. When the intensity of the laser beam is low, the direction of magnetization of the recording film 54b of the disk 54 is held in the direction of magnetization in the erase mode. In this manner, a magnetic pattern corresponding to the information is left on the recording film 54b of the disk 54, and the recording operation is completed. Note that the distribution of the second magnetic field 96 in the recording mode is the same as that in the erase mode.

As described above, when the inner circumferential portion 80 of the conductor 78 of the first coil 74 is made of a magnetic material, the magnetic gap of the head 52 can be changed between the magnetic gap A in a magnetic field modulation recording operation and the magnetic gap B in a light modulation recording operation. In other words, only the main magnetic pole 68 serves as a main magnetic pole in a magnetic field modulation recording operation, whereas both the first coil 74 and the main magnetic pole 68 serve as main magnetic poles in a light modulation recording operation. Therefore, in a light modulation recording operation, the cross-sectional area of the main magnetic pole of the head 52 on a plane parallel to the recording film 54b of the disk 54 is increased, and the magnetic resistance is reduced by an amount corresponding to the inner circumferential portion 80 (see FIG. 9) of the conductor 78 of the first coil 74 made of a magnetic substance.

This reduction in magnetic resistance becomes conspicuous as the volume of the magnetic material (inner circumferential portion 80) of the first coil 74 and the permeability of the magnetic material are increased. It is possible to decrease the magnetic resistance of the first coil 74 per unit volume by increasing the volume of the inner circumferential portion 80 relative to the volume of the outer circumferential portion 82 and the insulating film 84 which are made of nonmagnetic materials, or by utilizing a material of higher magnetic permeability. Thus, the magnetic resistance can become closer to the magnetic resistance of the core 66 and the main magnetic pole 68 which are formed only of magnetic materials such as ferrite. Therefore, the first coil 74 is mounted on the main magnetic pole 68 made of ferrite or the like, the first coil 74 can be made equivalent to the main magnetic pole 68 and the core 66 as compared with the second coil 76.

The magnetic properties of a magnetic material for the inner circumferential portion 80 of the first coil 74 are required to satisfy the following two requirements. First, when a DC magnetic field is applied to the material, it must exhibit a high effective permeability and must not be magnetically saturated. With this properly, while a magnetic flux of a DC magnetic field is allowed to easily pass through the inner circumferential portion 80 in a light modulation recording operation, magnetic saturation is not easily caused by this magnetic field. Second, when a high-frequency alternating field is applied to the material, it must exhibit a low effective permeability. With this property, even if a high-frequency current having a frequency of several MHz flows in the magnetic material, an increase in parasitic inductance generated when the magnetic material responds to this high-frequency current can be prevented.

As a conductive, magnetic material which satisfies such requirements of properties, a magnetic material for low frequencies is suitable. As this magnetic material for low frequencies, an iron alloy such as silicon steel or a permalloy (permeability alloy) is available. Such a material has a high saturation magnetic flux density, exhibits a high effective permeability during application of a DC magnetic field, and exhibits an effective permeability of several tens or less during application of an alternating field having a high frequency of 5 MHz or more.

In general, the above-described magnetic material for the inner circumferential portion 80 of the first coil 74 has a conductivity lower than that of a nonmagnetic conductive material, such as copper, constituting the outer circumferential portion 82. For this reason, a resistance component, in the inner circumferential portion 80, which corresponds to a loss in high-frequency excitation is larger than a resistance component in the outer circumferential portion 82. However, the number of turns of the first coil 74 is set to be about 10 to 20 so as to decrease the head inductance in a magnetic field modulation recording operation, and is relatively small. In addition, since the outer circumferential portion 82 of the first coil 74 is made of a nonmagnetic conductive material, a high-frequency current having a frequency of several MHz mainly flows in the outer circumferential portion 82 owing to a skin effect. For these reasons, the loss in the first coil 74 as a magnetic field modulation coil and the loss in the corresponding coil driving circuit due to an increase in the resistance of the first coil 74 can be reduced.

According to the embodiment, the inner circumferential portion 80 of the conductor 78 of the first coil 74 for magnetic field modulation is made of a conductive, magnetic material. Hence, the cross-sectional area of the main magnetic pole in a light modulation recording operation can be set to be substantially larger than that of the main magnetic pole in a magnetic field modulation recording operation.

In a light modulation recording operation, therefore, magnetic saturation of the main magnetic pole can be prevented to improve the recording efficiency. Consequently, a current and the number of turns of the second coil for light modulation need not be increased.

In a magnetic field modulation recording operation, since the cross-sectional area of the main magnetic pole is small, the inductance can be decreased, and a reduction in impedance in high-frequency excitation can be achieved. Therefore, even if a high-frequency alternating field is to be generated, the power consumption of the head driving circuit can be suppressed low.

The second embodiment will be described next with reference to FIGS. 13 to 18. Note that the same reference numerals in the second embodiment denote the same parts as in the first embodiment, and only a different part will be described.

Figure 13:
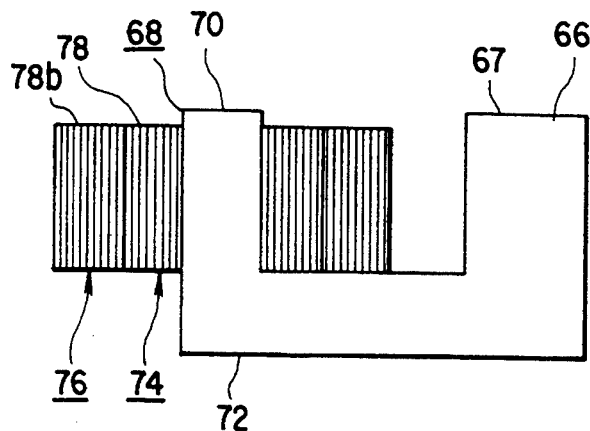
FIG. 13 is a partially cutaway side view showing a magnetic head according to the second embodiment of the present invention.
Figure 14:
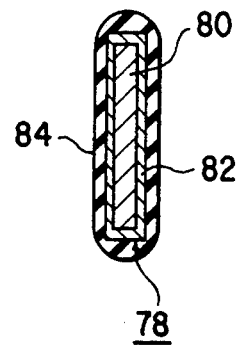
FIG. 14 is a sectional view of a conductor of a first coil in the second embodiment, taken along a direction perpendicular to a current flowing in the conductor.
Figure 15:
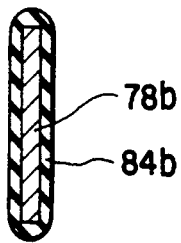
FIG. 15 is a sectional view of a conductor of a second coil in the second embodiment, taken along a direction perpendicular to a current flowing in the conductor.

In the second embodiment, as shown in FIG. 13, both conductors 78 and 78b of first and second coils 74 and 76 have low profiles. These conductors 78 and 78b are shown in FIGS. 14 and 15, respectively. As shown in FIG. 14, the conductor 78 of the first coil 74 has inner and outer circumferential portions 80 and 82, which are covered with an insulating member 84. As shown in FIG. 15, the conductor 78b of the second coil 76 is covered with an insulating member 84b. The materials for the conductors 78 and 78b and the insulating members 84 and 84b are the same as those used in the first embodiment.

By forming the conductors 78 and 78b of the first and second coils 74 and 76 into the low-profile members in this manner, the gap between the conductors can be reduced as compared with conductors having circular cross-sections. Therefore, the winding density can be increased, and a high-frequency resistance can be prevented by eliminating nonuniformity of a current density due to a skin effect caused when a high-frequency current flows.

Figure 16:
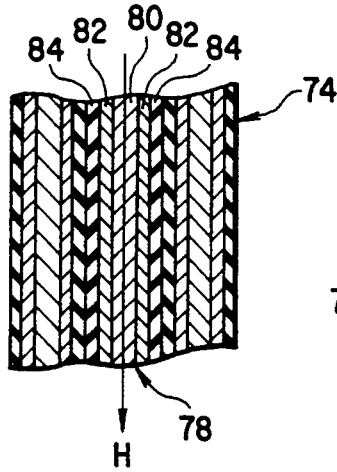
FIG. 16 is a sectional view of the first coil in the second embodiment, taken along a direction perpendicular to a current.
Figure 17:
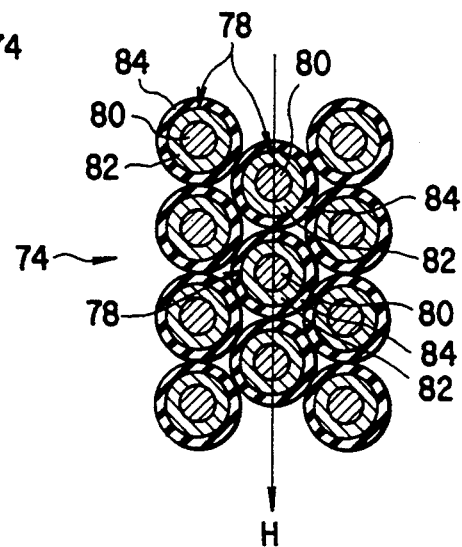
FIG. 17 is a sectional view showing the first coil in the first embodiment, taken along a direction perpendicular to a current, to compare it with the first coil shown in FIG. 16.

In the first coil 74 in the first embodiment, as shown in FIG. 17, the nonmagnetic outer circumferential portion 82 and the insulating member 84 are present between the inner circumferential portion 80 and another inner circumferential portion 80, and the inner circumferential portions 80 are not continuously arranged with respect to a direction H of a magnetic flux passing through the main magnetic pole 68 (shown in FIG. 13). In contrast to this, in the first coil in the second embodiment, since the conductor 78 is formed into a low-profile member, the inner circumferential portion 80 as a magnetic substance is continuous with respect to a direction H of a magnetic flux passing through the main magnetic pole 68 (shown in FIG. 13), as shown in FIG. 16. Therefore, the magnetic resistance can be reduced.

Figure 18:
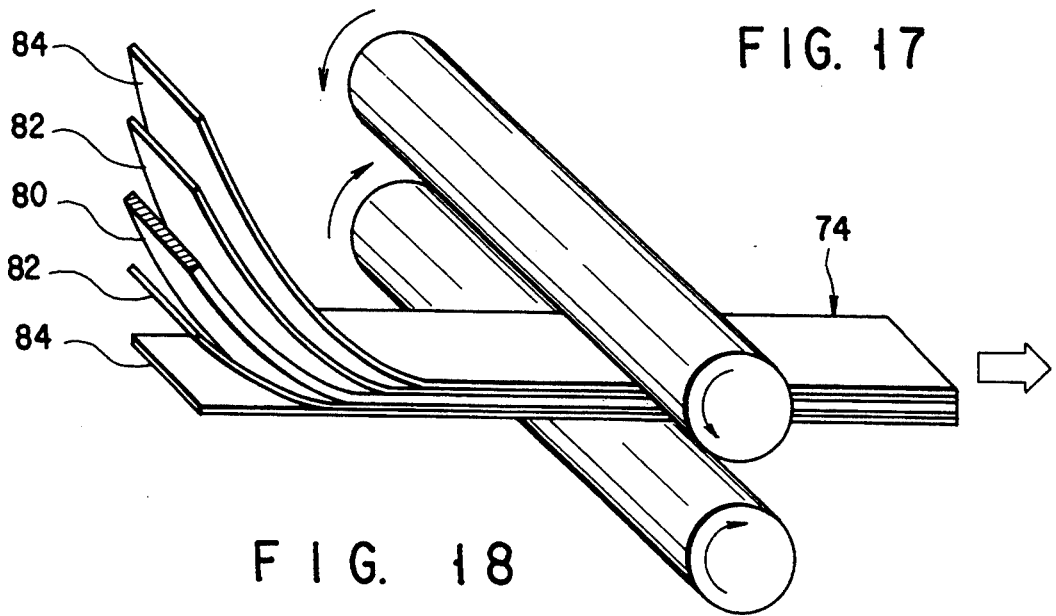
FIG. 18 is a perspective view for explaining a process of forming the first coil of the second embodiment.

Note that the low-profile conductor 78 and the insulating member 84 of the first coil 74 can also be manufactured by the process shown in FIG. 18. An adhesive agent is coated on each of the following low-profile members: an inner circumferential portion 80, outer circumferential portions 82, and insulating members 84. Thereafter, these members are stacked and clamped between rollers to be laminated.

If the first coil 74 is formed in this manner, a coil can be easily manufactured at a low cost as compared with the case of the conductor 78a shown in FIG. 10, which is manufactured by bundling the wires 86 and 88 together or integrally forming them by drawing. It is apparent that the second coil 76 can be manufactured by the same process as described above.

If an amorphous alloy or a permalloy is used as a conductive, magnetic material for the inner circumferential portion 80, such a material to be obtained is in the market in the shape of a low-profile member. Therefore, the above-described low-profile coil can be more easily manufactured.

Figure 19:
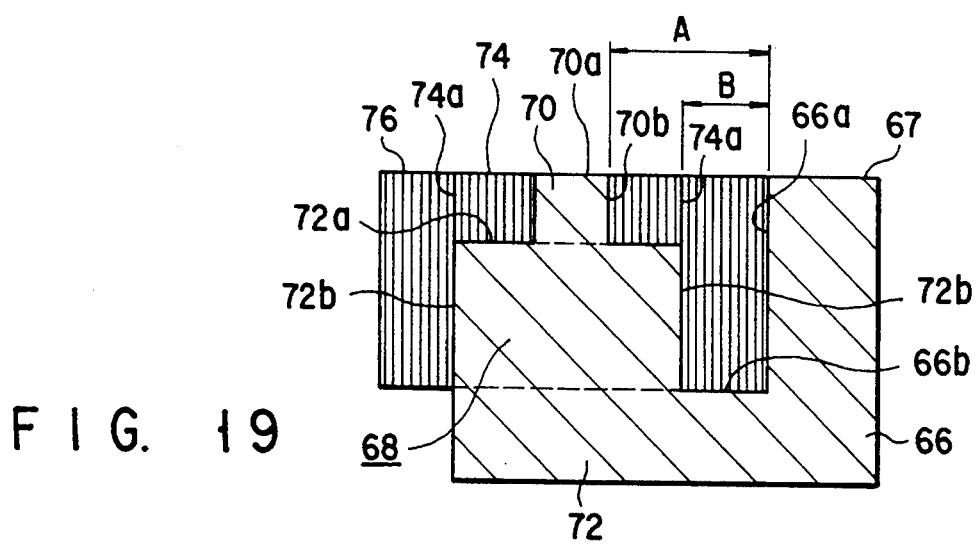
FIG. 19 is a longitudinal sectional view showing a magnetic head of the third embodiment.

The third embodiment will be described next with reference to FIG. 19.

In the third embodiment, a first end 70 of a main magnetic pole 68 is set to be thinner than a second end 72. A first coil 74 extends between an upper surface 70a of the first end 70 and an upper surface 72a of the second end 72 in a direction parallel to the winding shaft of the first coil 74, i.e., the height direction. In a direction perpendicular to the winding shaft, i.e., the widthwise direction, the first coil 74 extends between an outer surface 70b of the first end 70 and an outer surface 72b of the second end 72. In other words, the first coil 74 is wound around the first end 70 to be in contact with the outer surface 70b of the first end 70, while an outer surface 74a of the first coil 74 is located on the same plane as that of the outer surface 72b of the second end 72.

A second coil 76 extends between the upper surface 70a of the first end 70 and a bottom surface 66b of a core 66 in the height direction. In the widthwise direction, the second coil 76 extends between the outer surface 74a of the first coil 74, the outer surface 72b of the second end 72, and an inner side surface 66a of the core 66. In other words, the second coil 76 is wound around the first coil 74 and the second end 72 to be in contact with the outer surface 74a of the first coil 74 and the outer surface 72b of the second end 72.

In this embodiment, the gap between the outer surface 70b of the first end 70 and the inner surface 66a of the core 66 serves as a magnetic gap A in a magnetic field modulation recording operation, whereas the gap between the outer surface 74a of the first coil 74, the outer surface 72b of the second end 72, and the inner side surface 66a of the core 66 serves as a magnetic gap B in a light modulation recording operation.

According to the embodiment, only a main magnetic pole portion around which the first coil 74 for magnetic field modulation is wound, i.e., the first end 70, is narrowed to decrease the cross-sectional area of the first end 70. With this structure, since the inductance viewed from the first coil 74 can be further reduced, the impedance of the head at a high frequency can be decreased, thus reducing the loss in the head driving circuit.

In addition, the second end 72 is magnetically coupled to the first end 70 and is in contact with the first coil 74 on the upper surface 72a. With this structure, the magnetic resistance of a magnetic path formed around the first coil 74 is reduced, and the recording efficiency of the head in a magnetic field modulation recording operation can be improved, as compared with the other embodiments in which the second end 72 is not in contact with the first coil 74.

Figure 20:
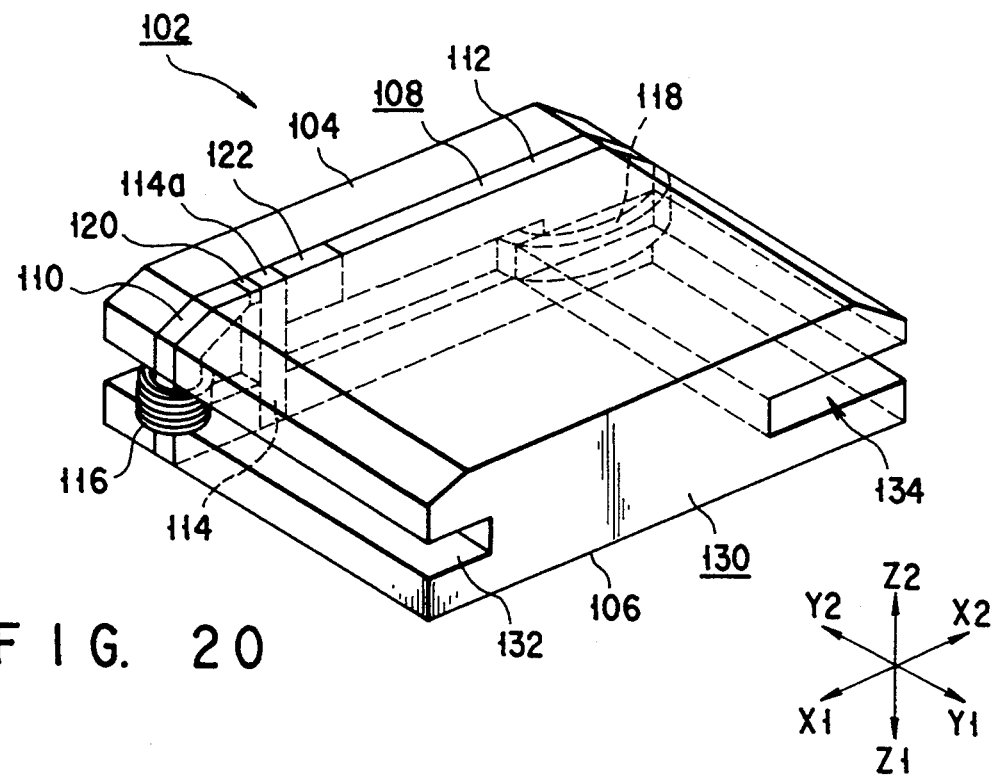
FIG. 20 is a perspective view showing a magnetic head of the fourth embodiment.

The fourth embodiment of the magneto-optic recording magnetic head of the present invention will be described below with reference to FIGS. 20 to 25. Referring to FIG. 20, the X axis indicates the tangential direction of a disk; the Y axis, the radial direction of the disk; and the Z axis, a direction perpendicular to the disk.

Referring to FIG. 20, reference numeral 102 denotes a head of this embodiment. A surface, of the head 102, denoted by reference numeral 104 opposes an optical recording medium, e.g., a magneto-optic disk (to be simply referred to as a disk hereinafter) (not shown). The head 102 is supported by a ginbal spring (not shown) which contacts with a surface of the head 102 denoted by reference numeral 106. The surfaces 104 and 106 will be respectively referred to as an opposing surface and a supporting surface hereinafter. The surface, of the head 102, located on the side indicated by an arrow $Y_1$ is located on the outer circumferential side of the disk (not shown), whereas a surface on the side indicated by an arrow $Y_2$ is located on the inner circumferential side of the disk.

The head 102 includes a yoke 108 made of a magnetic material such as ferrite. The yoke 108 has a first yoke portion 110, a second yoke portion 112, and a third yoke portion 114. The end portion, of the third yoke portion 114, located on the supporting surface 106 side is magnetically coupled to the first and second yoke portions 110 and 112. The third yoke portion 114 is equivalent to the main magnetic pole of the head 102. The first to third yoke portions 110, 112, and 114 are separately formed in this embodiment. However, these yokes may be integrally formed to be used as a yoke 108.

The portion, of the first yoke portion 110, located on the side indicated by an arrow $X_1$ has a substantially square cross-section in X-Y plane, around which a first coil 116 for magnetic field modulation is wound. The portion, of the second yoke portion 112, located on the side indicated by an arrow $X_2$ has an elongated rectangular cross-section in X-Y plane, around which a second coil 118 for light modulation is wound. With this structure, the first coil 116 has a substantially circular cylindrical shape, whereas the second coil 118 has an elliptic cylindrical shape.

An end portion 114a, of the third yoke portion 114, located on the opposing surface 104 side is arranged to oppose a light spot radiated on a disk (not shown). The end portion 114a is jointed to first and second magnetic gaps (to be simply referred to as first and second gaps hereinafter) 120 and 122. The first and second gaps 120 and 122 are made of nonmagnetic substance and have different lengths along the X and Y axes. The first gap 120 is jointed to the first yoke portion 110. The second gap 122 is joined to the second yoke portion 112.

Figure 21:
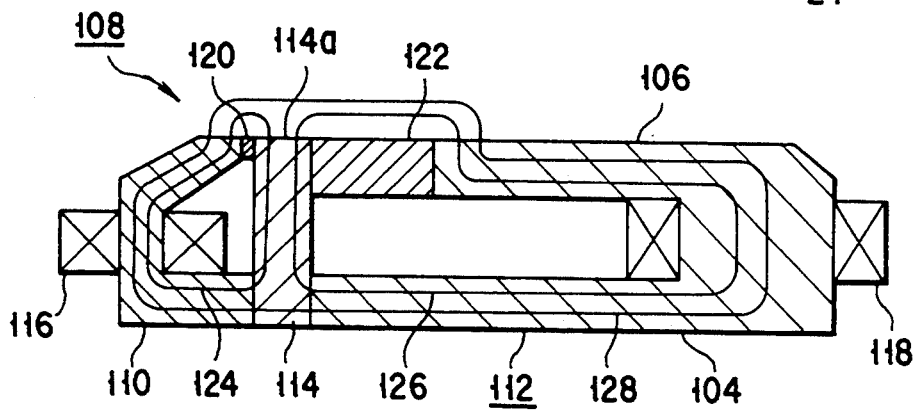
FIG. 21 is a sectional view showing yoke portions and coils of the head in FIG. 20.

The following three magnetic paths are formed in the yoke 108 having such a structure. As shown in FIG. 21, a first magnetic path (first magnetic circuit) 124 extends through the first and third yoke portions 110 and 114 and is closed outside the yoke 108 to avoid the first gap 120. A second magnetic path (second magnetic circuit) 126 extends through the second and third yoke portions 112 and 114 and is closed outside the yoke 108 to avoid the second gap 122. A third magnetic path (third magnetic circuit) 128 extends through the first and second yokes 110 and 112 and the end portion, of the third yoke portion 114, located on the supporting surface 106 side, and is closed outside the yoke 108 to avoid the first and second gaps 120 and 122 and the end portion 114a, of the third yoke portion 114, located on the opposing surface 104 side.

As shown in FIG. 20, a slider 130 made of a nonmagnetic substance consisting of a ceramic material or the like is attached to the yoke 108 in tight contact therewith. A groove for storing an adhesive agent is formed in a portion (not shown) of the slider 130. The slider 130 is mounted on the yoke 108 by putting an adhesive agent in this groove.

Grooves 132 and 134 are respectively formed in the end portions, of the slider 130, located on the sides indicated by the arrows $X_1$ and $X_2$. Grooves 132 and 134 extend along the Y axis. These grooves 132 and 134 have thicknesses and depths which allow the first and second coils 116 and 118 to be inserted with predetermined play. With this structure, even after the yoke 108 and the slider 130 are joined to each other, the first and second coils 116 and 118 can be wound around the first and second yoke portions 110 and 112, respectively.

An operation of recording data on a disk by using the head of the fourth embodiment having the above-described arrangement will be described below.

Figure 22:
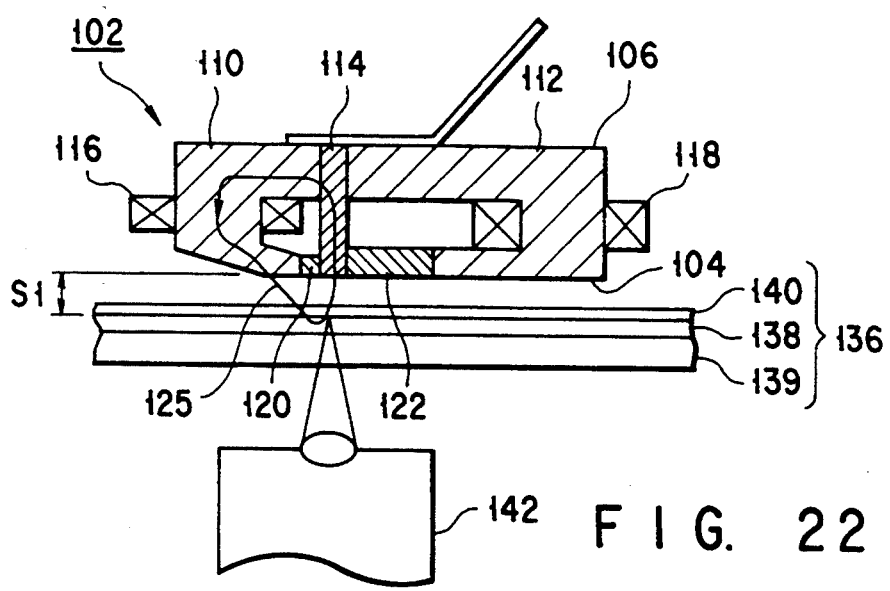
FIG. 22 is a sectional view for explaining an operation of the head in FIG. 20 in the magnetic field modulation recording mode.

When a magnetic field modulation recording operation is to be performed by using the head of the fourth embodiment, the head 102 is moved above a disk 136, and is floated from the disk 136 by a flow of air generated by rotating the disk 136, as shown in FIG. 22. In this case, a distance S1 between the head 102 and a recording film 138 of the disk 136 is the sum of the floating amount of the head 102 and the thickness of a protective film 140 itself. This value is about several $\mu$m or several tens $\mu$m, although it depends on the linear velocity of the disk 136.

Subsequently, a current whose polarity changes in accordance with a recording signal is supplied from a magnetic field modulator (not shown) to the first coil 116. When the magnetic resistance of the first magnetic path 124 (in FIG. 21) is smaller than that of the third magnetic path 128, a magnetic flux mainly passes through the first magnetic path 124. As a result, as shown in FIG. 22, the vertical component of a magnetic field (first magnetic field) 125 leaking from the end portion, of the third yoke portion 114, located on the opposing surface 104 side is applied to the recording film 138 of the disk 136, while a laser beam having a predetermined intensity, which is emitted from an optical pickup 142 opposite to the head 102, is focused on the recording film 138, thus performing magnetic field modulation recording.

Figure 23:
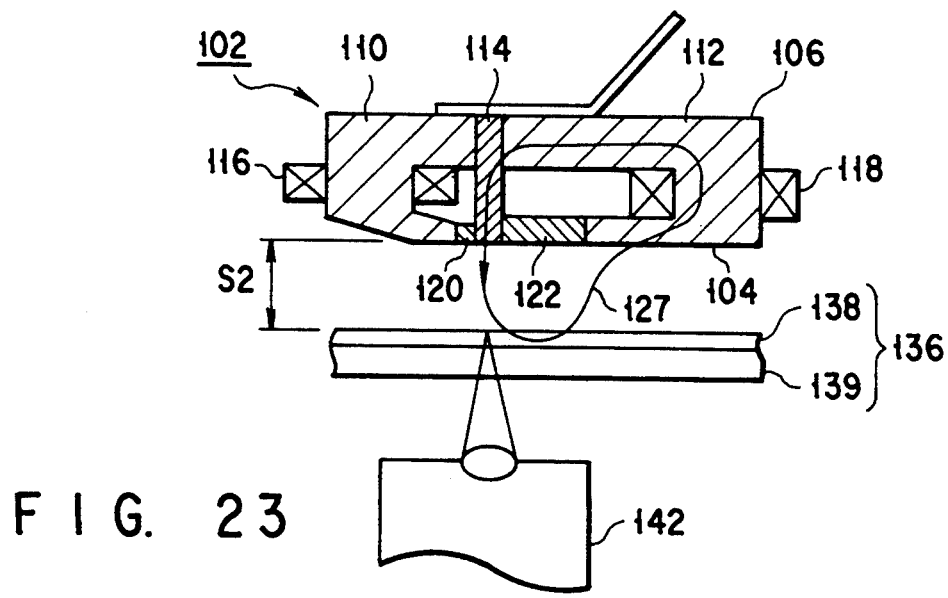
FIG. 23 is a sectional view for explaining an operation of the head in FIG. 20 in the light modulation recording mode.

When light modulation recording is to be performed by using the head of the embodiment, the head 102 is fixed to a position separated from the recording film 138 of the disk 136 by an amount exceeding the floating amount of the head 102 in magnetic field modulation, as shown in FIG. 23. In this case, a distance S2 between the head 102 and the recording film 138 of the disk 136 is set to be a value which prevents collision between the head 102 and disk 136 due to the surface fluctuations of the disk 136 and vibrations externally acting on the head 102. In the embodiment, the distance S2 is set to be 100 μm or more.

Subsequently, a predetermined current whose polarity is different between the erase and write modes is supplied from a magnetic field applying circuit (not shown) to the second coil 118. When the magnetic resistance of the second magnetic path 126 shown in FIG. 21 is smaller than that of the third magnetic path 128, a magnetic flux mainly passes through the second magnetic path 126. Subsequently, as shown in FIG. 23, the vertical component of a magnetic field (second magnetic field) 127 leaking from the end portion, of the third yoke portion 114, located on the opposing surface 104 side is applied to the recording film 138, while a laser beam whose intensity changes in accordance with a recording signal, which laser beam is emitted from the optical pickup 142 opposite to the head 102, is focused on the recording film 138, thus performing light modulation recording.

As described above, the distance between the head 102 and the disk 136 is different between the magnetic field modulation recording mode and the light modulation recording mode. Therefore, in the embodiment, the first and second gaps 120 and 122 are set to obtain optimal magnetic field strengths in the respective cases.

The relationship between the gap length and magnetic field strength, i.e., the relationship between the gap length and the magnetic flux will be described below with reference to FIGS. 24 and 25.

Figure 24:
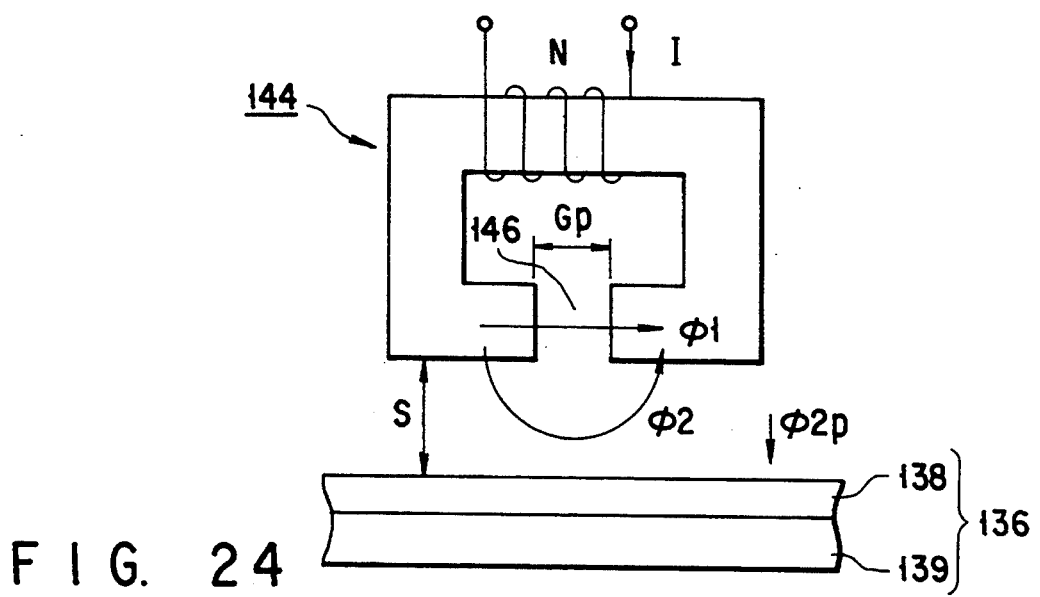
FIG. 24 is a sectional view showing a head to explain the relationship between the gap and the magnetic flux.

FIG. 24 shows a general magnetic head. Assume that a magnetomotive force N1 of a magnetic head 144 is constant, and a magnetic field is applied to the recording film 138 located at a position separated from a gap 146 by a predetermined distance S. In this case, as a length Gp of the gap 146 is reduced, the passage of a magnetic flux is facilitated, and hence the magnetic resistance of the head 144 is reduced. As a result, a magnetic flux $\Phi 1$ passing through the gap 146 increases. However, the distance at which a magnetic flux $\Phi 2$ leaking from the gap 146 extends to the surrounding is reduced, and a vertical component $\Phi 2P$, of the magnetic flux $\Phi 2$, which reaches the recording film 138 is reduced.

In contrast to this, when the length of Gp of the gap 146 is increased, the leakage magnetic flux $\Phi 2$ increases. At the same time, the magnetic resistance of the head 144 increases. For this reason, if the gap 146 is increased beyond a certain range, both the magnetic fluxes $\Phi 1$ and $\Phi 2$ decrease. In this case, therefore, the vertical component $\Phi 2P$ is also reduced.

That is, there is a gap length which maximizes the vertical component of a leakage magnetic field corresponding to a recording magnetic field in accordance with the distance S between the head and the disk recording film.

Figure 25:
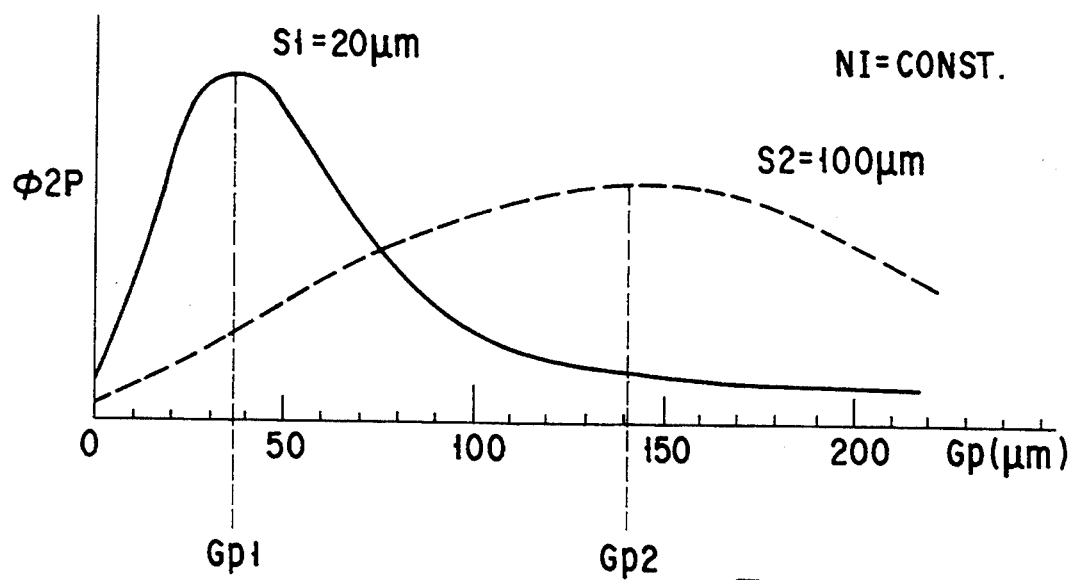
FIG. 25 is a graph showing the relationship between the gap and the magnetic flux in the head shown in FIG. 24.

FIG. 25 is a graph showing changes in the leakage magnetic flux $\Phi 2$ applied to the recording film 138, i.e., the vertical component $\Phi 2P$ of the magnetic flux $\Phi 2$ leaking from the gap 146, as a function of the length Gp of the gap 146. This graph indicates the above-describe relationship with respect to the distance S1 (=20 μm) almost corresponding to the distance between the head and the disk recording film in the magnetic field modulation recording mode, and the distance S2 (=100 μm) almost corresponding to the distance between the head and the disk recording film in the light modulation recording mode. With the distance S1, the vertical component $\Phi 2P$ is maximized when the gap is on $Gp_1$ which is about 35 μm. With the distance S2, the vertical component $\Phi 2P$ is maximized when the gap is on $Gp_2$ which is about 140 μm. In the embodiment, therefore, the first gap 120 for the magnetic field modulation recording mode is set to be 35 μm, and the second gap 122 for the light modulation recording mode is set to be 140 μm.

In this manner, two gaps having different lengths are set at the yoke of a head, and the lengths of the two gaps are set to maximize a magnetic field applied to a disk in accordance with the distance between the head and the disk in each of the modes, the magnetic field modulation recording mode and the light modulation recording mode. With this setting, the maximum recording efficiency can be achieved in both the magnetic field modulation mode and the light modulation mode.

That is, by using the head of the embodiment, a recording operation can be performed with the maximum magnetic field recording efficiency in accordance with the distance between the head and the disk. Therefore, by reducing the magnetomotive force NI of the first and second coils 116 and 118, a reduction in the power consumption of the coils and the coil excitation circuit can be realized. In addition, since the coils can be reduced in size and weight, floating of the head can be stabilized.

As shown in FIG. 20, if the first and second gaps 120 and 122 of the yoke 108 are made of nonmagnetic substances such as ceramic and are set on the same plane as that of the opposing surface 104 of the slider 130 to reduce the unevenness of the opposing surface 104, stable floating characteristics can be obtained.

Furthermore, since the grooves 132 and 134 are formed in the slider 130, the first and second coils 116 and 118 wound around the first and second yoke portions 110 and 112 are not exposed near the opposing surface 104. Therefore, no deterioration in floating characteristics occurs, and the head can be easily processed.

Figure 26:
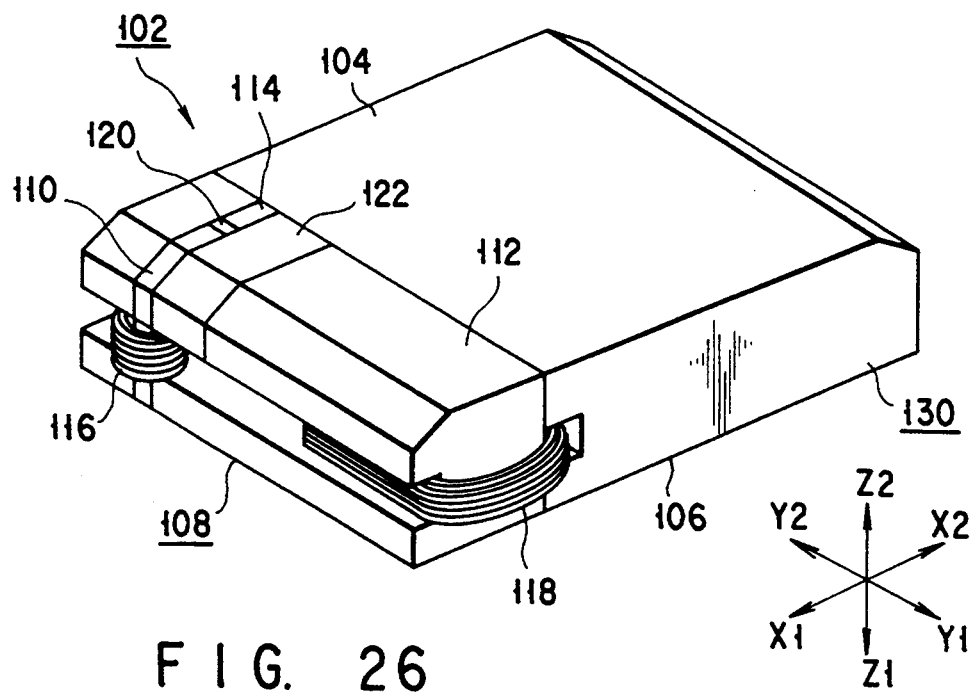
FIG. 26 is a perspective view showing a head of the fifth embodiment.
Figure 27:
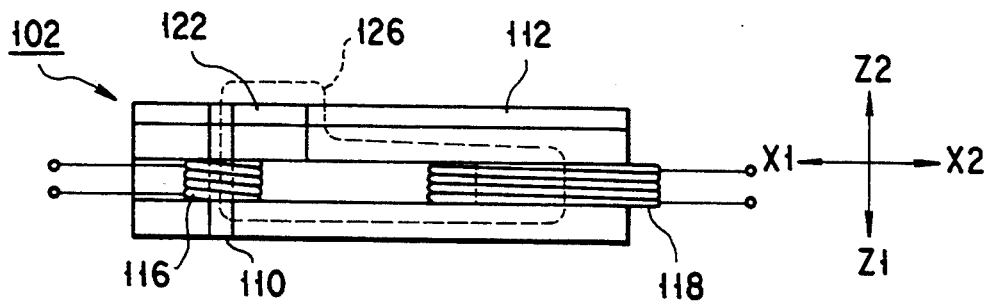
FIG. 27 is a front view of the head in FIG. 26.
Figure 28:
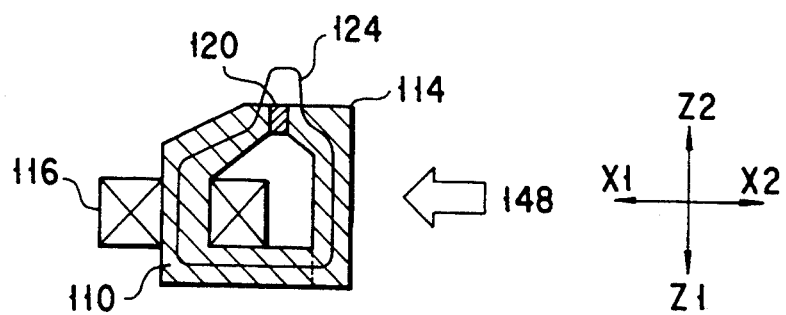
FIG. 28 is a sectional view showing a first yoke in FIG. 26 from its side.

A head of the fifth embodiment will be described next with reference to FIGS. 26 to 28. Note that the same reference numerals in the fifth embodiment denote the same parts as in the fourth embodiment, and only a different part will be described.

The head of the fifth embodiment is different from that of the fourth embodiment in that first and second yokes are arranged to set the first and second magnetic paths in the fourth embodiment to be perpendicular to each other.

In this embodiment, the outer shape of a second yoke portion 112 on the XZ plane is almost the same as the outer shapes of the first and third yoke portions 110 and 114. The second yoke portion 112 is located on the side, of a head 102, indicated by an arrow $X_1$ and extends along the Y axis. Therefore, the cross-sectional area of a yoke 108 (first to third yoke portions 110, 112, and 114) on the YZ plane is very large as compared with that in the fourth embodiment.

The second yoke portion 112 is magnetically joined to the surface, of the first yoke portion 110, located on the side indicated by an arrow $Y_1$. A second gap 122 is set to be slightly longer than that in the fourth embodiment. In the fifth embodiment, however, similar to the fourth embodiment, the respective gaps 120 and 122 are set to maximize the recording efficiency in accordance with the distance between the head and the disk.

According to the fifth embodiment, the following effects can be obtained, while the effects of the fourth embodiment are maintained.

1. The magnetic path of the first coil 116 corresponds to the first magnetic path 124. The first magnetic path 124 runs through a portion of the yoke 112, including the third yoke portion 114, which has the cross-sectional area or thickness. The thickness of the portion of the yoke must be decreased in order to reduce the inductance of the first coil 116 in both the fourth and fifth embodiments. Because the first coil 116 applies an alternating field, whose polarity changes in accordance with a recording signal, to the disk.

It is apparent that as the thickness of the yoke is increased, the magnetic resistance of the magnetic path increases.

In contrast to this, since the second coil 118 serves to apply a DC magnetic field (whose polarity changes in only recording and erasing operations), inductance is irrelevant to the second coil 118. Therefore, the magnetic resistance of the second yoke portion 112 can be reduced by increasing the thickness of the second yoke portion 112 around which the second coil 118 is wound. In the fourth embodiment, however, the second magnetic path 126 formed by the second coil 118 passes through the third yoke portion 114 described above. For this reason, it is very disadvantageous to thicken the third yoke portion 114 in relation to inductance. Even if the second yoke portion 112 is thickened, since the third yoke portion 114 cannot be thickened, the magnetic resistance of the second magnetic path 126 cannot be reduced in the fourth embodiment.

In the fifth embodiment, however, both the first and third yoke portions 110 and 114 constitute the second magnetic path 126 through the gap 122. With this structure, as compared with the fourth embodiment, the magnetic resistance can be reduced in proportion to an increase in the cross-sectional area of the second yoke portion 112, thus increasing the density of magnetic fluxes generated by the second coil 118.

2. Assume, that in the fifth embodiment, when a DC leakage magnetic field 148 in the tangential direction of the disk ($X_1$ direction) as shown in FIG. 28 is applied from an external unit, e.g., an optical pickup, onto the first yoke portion 110 corresponding to a head for magnetic field modulation mode. In this case, the cross-sectional area of the yoke 108, viewed from the direction of the leakage magnetic field 148 (the direction indicated by the arrow $X_1$), is larger than that of the magnetic head of the fourth embodiment and that of the conventional magnetic head for magnetic field modulation. For this reason, in the fifth embodiment, magnetic saturation does not easily occur as compared to these magnetic heads. Therefore, DC magnetic saturation of the first yoke 110 used for magnetic field modulation can be prevented to preclude a deterioration in high-frequency magnetic field generation efficiency.

3. In general, during a magnetic field modulation recording operation, an external magnetic field applied from an optical pickup or the like in a direction (Z-axis direction) perpendicular to the disk is present in addition to the above-mentioned external magnetic field from the tangential direction. This magnetic field may be applied to the disk. In this case, a bias DC magnetic field strong enough to cancel the external magnetic field in the Z-axis direction must be applied from the magnetic head to the disk.

In the fifth embodiment, therefore, a current is also supplied to the second coil 118 in the magnetic field modulation recording mode to apply a bias DC magnetic field to a disk 136, thus canceling the external magnetic field in the Z-axis direction.

In the fourth embodiment, if the second coil 118 is used as a means for applying a bias DC magnetic field, the bias DC magnetic field is mainly applied to only the third yoke portion 114. As a result, the third yoke portion 114 tends to be magnetically saturated. That is, since the bias DC magnetic field is applied to only the third yoke portion 114, of the first and third yoke portions 110 and 114 serving as the yoke of the first coil 116, part of the yoke of the first coil is magnetically saturated. In contrast to this, in the fifth embodiment, since a bias magnetic field is applied to the entire first and third yoke portions 110 and 114, the yoke of the first coil 116 is not partly magnetized, and magnetic saturation does not easily occur, thus ensuring a higher recording efficiency than the fourth embodiment.

Figure 29:
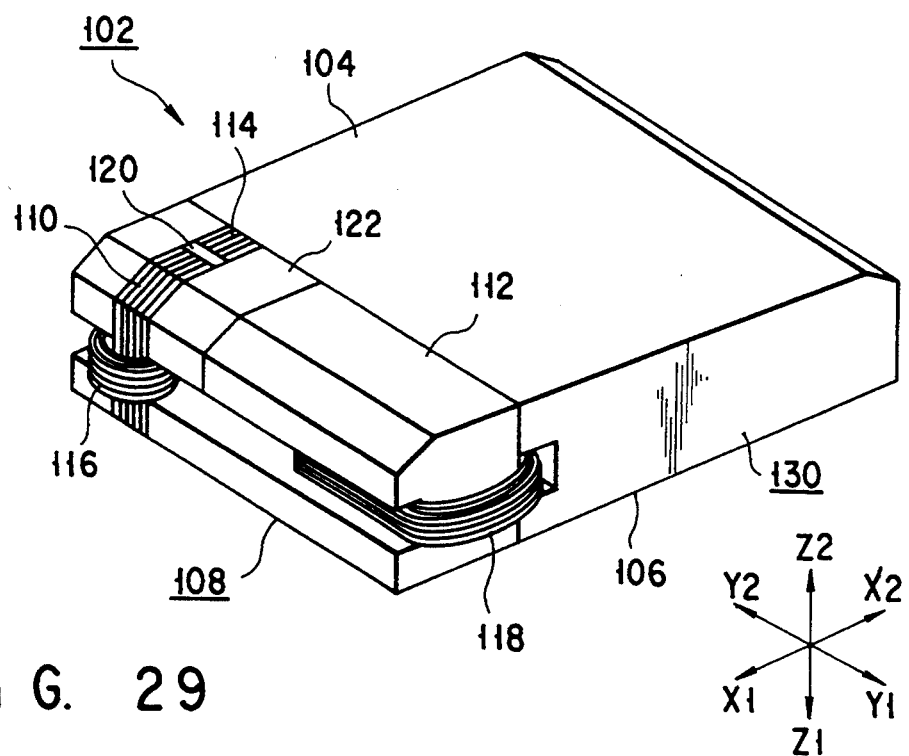
FIG. 29 is a perspective view showing a head of the sixth embodiment.

The sixth embodiment will be described next with reference to FIGS. 29 and 30. Since a head of the sixth embodiment has almost the same arrangement as that of the head of the fifth embodiment, only a different part will be described.

Figure 30:
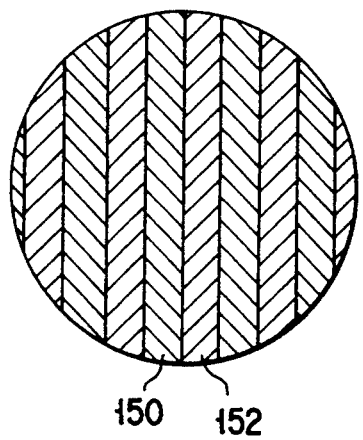
FIG. 30 is a partially enlarged, sectional view of a first yoke shown in FIG. 29.

As shown in FIG. 30, first and third yoke portions 110 and 114 of the head of the sixth embodiment are made of laminated layers, each constituted by a thin magnetic film 150 consisting of an amorphous alloy or a Sendust and a nonmagnetic thin film 152. That is, a material for these yoke portions exhibits a low loss even in high-frequency excitation. A second yoke portion 112 is made of a ferrite material exhibiting excellent magnetic properties in a DC magnetic field and a low-frequency alternating field.

As a material exhibiting excellent magnetic properties at high frequencies, a high-density ferrite material, a thin film used in the embodiment, or the like is generally used. The cost of such a material per unit volume is higher than that of a material for low frequencies.

For example, an Mn-Zn-based ferrite material for a high-density digital magnetic head is used for a magnetic head for a hard disk drive. For this reason, advanced manufacturing techniques are required, e.g., reducing the particle size of the material to increase the density so as to allow a high-precision process, and increasing the saturation magnetic flux density to allow recording of data on a medium having a high coercive force. For this reason, the cost of this material is higher than that of a low-frequency ferrite material generally used for an audio unit.

In the sixth embodiment, therefore, the second yoke portion 112 having a large volume and associated with light modulation is made of a single, inexpensive, low-frequency magnetic material different from the material for the first and third yoke portions 110 and 114 associated with magnetic field modulation. Therefore, a low-cost magnetic head can be obtained as compared with the case wherein the yoke 108 is entirely made of a single, high-frequency, magnetic material. In addition, since a magnetic material exhibiting optimal characteristics in magnetic field modulation and light modulation can be selected as a yoke member, the recording efficiency of the head in both the modulation schemes can be improved.

As described above, according to the fourth to sixth embodiments, a high magnetic field generation efficiency (recording efficiency) can be obtained in both the light modulation recording mode and the magnetic field modulation recording mode. Since the recording efficiency is improved, a magnetic field sufficient for a recording operation can be obtained with a small magnetomotive force. Consequently, stable floating characteristics can be obtained by reducing the head coils in size and weight, and the power consumption of the head and the head driving circuit can be reduced.

In addition, the gap portion of the head is made of a nonmagnetic material, and the coils of the head are not exposed to the slider surface. With this structure, the unevenness of the slider surface of the head can be reduced to obtain stable floating characteristics of the head.

Furthermore, a leakage magnetic field from outside the head can be coped with by properly selecting the shape of the yoke portion, thus preventing a deterioration in recording efficiency due to magnetic saturation of the yoke portion, of the magnetic head, associated with magnetic field modulation recording.

In the fourth to sixth embodiments, the grooves are formed in the slider, and an adhesive agent is put in these grooves, thereby joining the slider to the yoke. However, the slider and the yoke may be joined to each other by forming a thin adhesive later or a thin glass welding layer therebetween.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A magneto-optic recording magnetic head for applying first and second magnetic fields to a magneto-optic recording medium having a recording film, the first magnetic filed changing in polarity in accordance with a recording signal, and the second magnetic field exhibiting different polarities in an erase mode and a recording mode but undergoing no change in polarity in accordance with a recording signal, the magnetic head comprising:

a first coil for exciting the first magnetic field;

a first yoke, around which the first coil is wound, and which has two ends in a plane which is substantially parallel to the recording film, for applying the first magnetic field excited by the first coil to the recording film through one of the two ends of the first yoke;

a second coil for exciting the second magnetic field; and a second yoke, around which the second coil is wound, and which has a plurality of ends in the plane substantially parallel to the recording film, for applying the second magnetic field excited by the second coil to the recording film through one of the plurality of ends of the second yoke, and wherein:

the first and second coils are arranged separated from each other in a direction parallel to the recording film, so that a first coil center line extending perpendicular to a plane surrounded by the first coil and a second coil center line extending perpendicular to a plane surrounded by the second coil are parallel to each other, the first yoke and the second yoke are magnetically coupled to each other, and an effective area of the first magnetic field applied from the first yoke to the recording film and an effective area of the second magnetic field applied from the second yoke to the recording film are different from each other.

2. A magneto-optic recording magnetic head according to claim 1, wherein:

the first and second yokes jointly comprise an elongated main pole, said main pole having one end facing toward the recording film of the magneto-optic recording medium and another end facing in a direction opposite from the direction in which said one end faces, the first yoke further includes an annular shaped first yoke main portion having one end connected through a gap to said one end of the main pole and another end magnetically connected to another end of the main pole, and the first coil is wound around a portion of the first yoke main portion between said one end and said another end of thereof, the second yoke further includes an annular shaped second yoke main portion having one end connected through a gap to said one end of the main pole and another end magnetically connected to said another end of the main pole, and the second coil is wound around a portion of the second yoke main portion between said one end and said another end of thereof, an area of the gap of the first yoke in a plane parallel to the recording film of the magneto-optic recording medium is smaller than that of the gap of the second yoke, a magnetic path for the first magnetic field is formed in the main pole and the first yoke main portion of the first yoke when the first coil is excited, and a magnetic path for the second magnetic field is formed in the main pole and the second yoke main portion of the second yoke when the second coil is excited.

3. A magneto-optic recording magnetic head according to claim 2, wherein the first yoke main portion of the first yoke and the second yoke main portion of the second yoke are arranged at respective opposite sides of the main pole and are adjoining to the main pole to hold the main pole between them in a plane perpendicular to the recording film of the magneto-optic recording medium.

4. A magneto-optic recording magnetic head according to claim 3, further comprising:
a yoke supporting member, made of a non-magnetic material, fixed on same side surfaces of the first and second yokes; and
two grooves for containing the first and second coils are formed, in portions of the yoke supporting member, said portions of the yoke supporting member corresponding to portions of the first and second yokes around which the first and second coils are wound.

5. A magnetic-optic recording magnetic head according to claim 4, further comprising:
a yoke supporting member, made of a non-magnetic material, fixed on another same side surfaces of the first and second yokes, the other same side surfaces and the same side surfaces facing in opposite directions to each other; and
wherein two grooves for containing the first and second coils are formed in portions of the yoke supporting member, said portions of the yoke supporting member corresponding to the portions of the first and second yokes around which the first and second coils are wound.

6. A magneto-optic recording magnetic head according to claim 2, wherein:
the first yoke main portion of the first yoke and the second yoke main portion of the second yoke extend in respective directions crossing at substantially right angles;
said one end of the second yoke main portion is further connected through the gap to said one end of the first yoke main portion, and said another end of the second yoke main portion is further magnetically connected to said another end of the first yoke main portion.

7. A magnetic-optic recording magnetic head according to claim 6, further comprising:
a yoke supporting member, made of a non-magnetic material, fixed on an end surface of the main pole located opposite to the first yoke main portion of the first yoke and an end surface of the second yoke main portion which faces in the same direction in which the end surface of the main pole faces; and
wherein a groove for containing the second coil is formed in a portion of the yoke supporting member, said portion of the yoke supporting member corresponding to a portion of the second yoke around which the second coil is wound.

8. A magneto-optic recording magnetic head according to claim 2, wherein each of the main pole and the first yoke main portion of the first yoke includes a plurality of magnetic films and a plurality of non-magnetic films, the magnetic films and the non-magnetic films being laminated alternately to each other.

9. A magneto-optic recording magnetic head for applying first and second magnetic fields to a magneto-optic recording medium having a recording film, the first magnetic field changing in polarity in accordance with a recording signal, and the second magnetic field exhibiting different polarities in an erase mode and a recording mode but undergoing no change in polarity in accordance with a recording signal, the magnetic head comprising:
an elongated main pole including one end portion having one end facing toward the recording film of the magneto-optic recording medium and another end portion having another end facing in a direction opposite from the direction in which said one end faces;
a yoke including a magnetic material, and said yoke including one end portion having one end magnetically connected to said another end portion of the elongated main pole, and said another end portion located in a position separated from said one end of the main pole in a direction parallel to the recording film and facing toward the recording film;
a first coil for exciting a first magnetic field, wound around said one end portion of the main pole, and the first coil including a conductive member having in a cross section thereof an inner peripheral portion with an electrically conductive magnetic material, and an outer peripheral portion with an electrically conductive non-magnetic material, the outer peripheral portion covering the inner peripheral portion, and an insulating cover covering the outer peripheral portion of the conductive member; and
a second coil for exciting a second magnetic field, wound around an outer peripheral surface of the first coil, and the second coil including a conductive member with a conductive non-magnetic material and an insulating cover covering the conductive non-magnetic member of the second coil.

10. A magneto-optic recording magnetic head according to claim 9, wherein:
the inner peripheral portion of the conductive member of the first coil includes a plurality of conductive wires each of which is formed of a conductive magnetic material; and
the outer peripheral portion of the conductive member of the first coil includes a plurality of conductive wires each of which is formed of a conductive non-magnetic material.

11. A magneto-optic recording magnetic head according to claim 9, wherein:
each of the insulating cover and the conductive member of the first coil has a cross section elongated in a longitudinal direction of the main pole; and
each of the insulating cover and the conductive member of the second coil also has a cross section elongated in the longitudinal direction of the main pole.

12. A magneto-optic recording magnetic head according to claim 9, wherein:
said one end portion of the main pole includes a small diameter portion having said one end thereof, and a large diameter portion coaxially arranged with the small diameter portion and adjoining to said another end portion of the main pole;
the first coil is wound around the small diameter portion of said one end portion of the main pole; and
the second coil is wound around the small diameter portion of said one end portion of the main pole; and
the second coil is wound around an outer peripheral surface of the first coil and the large diameter portion.

* * * * *